United States Patent
Hao et al.

(10) Patent No.: US 11,962,528 B2
(45) Date of Patent: Apr. 16, 2024

(54) CSI FOR NON-COHERENT JOINT TRANSMISSION

(71) Applicant: QUALCOMM Incorporated, San Diego, CA (US)

(72) Inventors: Chenxi Hao, Beijing (CN); Yu Zhang, Beijing (CN); Liangming Wu, Beijing (CN); Qiaoyu Li, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/274,407

(22) PCT Filed: Aug. 23, 2019

(86) PCT No.: PCT/CN2019/102240
§ 371 (c)(1),
(2) Date: Mar. 8, 2021

(87) PCT Pub. No.: WO2020/052428
PCT Pub. Date: Mar. 19, 2020

(65) Prior Publication Data
US 2021/0328742 A1 Oct. 21, 2021

(30) Foreign Application Priority Data
Sep. 15, 2018 (WO) ............... PCT/CN2018/105897

(51) Int. Cl.
*H04B 7/06* (2006.01)
*H04L 5/00* (2006.01)

(52) U.S. Cl.
CPC ......... *H04L 5/0048* (2013.01); *H04B 7/0626* (2013.01); *H04B 7/0634* (2013.01); *H04L 5/0057* (2013.01)

(58) Field of Classification Search
None
See application file for complete search history.

(56) References Cited

U.S. PATENT DOCUMENTS

| 2013/0028182 A1 | 1/2013 | Geirhofer et al. |
| 2013/0114656 A1* | 5/2013 | Sayana .................. H04B 7/024 375/260 |

(Continued)

FOREIGN PATENT DOCUMENTS

| CN | 103391126 A | 11/2013 |
| CN | 103716116 A | 4/2014 |

(Continued)

OTHER PUBLICATIONS

Park et al., U.S. Appl. No. 62/591,698, Nov. 28, 2017 (Year: 2017).*

(Continued)

*Primary Examiner* — The Hy Nguyen
(74) *Attorney, Agent, or Firm* — Patterson & Sheridan LLP

(57) ABSTRACT

Certain aspects of the present disclosure provide techniques for channel state information (CSI) for multiple transmission reception point (multi-TRP) transmission such as non-coherent joint transmission (NCJT), including determining subband sizes for CSI and rules for Part II CSI omission. A method that can be performed by a user equipment (UE) includes receiving a CSI report configuration. The CSI report configuration associated with one or more CSI reference signal (RS) resources, each CSI resource including a set of ports or port groups. The UE selects one or more CSI-RS resources for which to report CSI and determines a subband size for sending a CSI report based, at least in part, on payload of the CSI report. In an example method, the UE (Continued)

can determine whether the UE has sufficient resources for the CSI report and omit at least a portion of the CSI based on the determination.

22 Claims, 13 Drawing Sheets

(56) References Cited

U.S. PATENT DOCUMENTS

| | | | |
|---|---|---|---|
| 2016/0156401 | A1 | 6/2016 | Onggosanusi et al. |
| 2017/0181022 | A1* | 6/2017 | Yang .................... H04B 7/0456 |
| 2017/0353222 | A1 | 12/2017 | Wei et al. |
| 2018/0331743 | A1* | 11/2018 | Shen .................... H04B 7/0626 |
| 2019/0053089 | A1* | 2/2019 | Kwak .................... H04W 72/23 |
| 2019/0074884 | A1* | 3/2019 | Chen .................... H04B 7/0456 |
| 2019/0109626 | A1* | 4/2019 | Park .................... H04B 7/0636 |
| 2019/0199420 | A1* | 6/2019 | Faxér .................... H04L 5/0057 |
| 2019/0215044 | A1* | 7/2019 | Noh .................... H04L 5/1469 |
| 2019/0215823 | A1* | 7/2019 | Kim .................... H04L 1/0031 |
| 2020/0099473 | A1* | 3/2020 | Han .................... H04L 5/0048 |
| 2020/0119797 | A1* | 4/2020 | Wang ................ H04W 72/0453 |
| 2020/0275432 | A1* | 8/2020 | Li .................... H04L 5/0057 |
| 2020/0295894 | A1* | 9/2020 | Kang .................... H04L 5/0026 |
| 2021/0314046 | A1* | 10/2021 | Kim .................... H04W 72/21 |

FOREIGN PATENT DOCUMENTS

| | | |
|---|---|---|
| CN | 105991244 A | 10/2016 |
| CN | 107113039 A | 8/2017 |
| WO | 2017117777 A1 | 7/2017 |
| WO | 2017128800 A1 | 8/2017 |

OTHER PUBLICATIONS

Kang et al., U.S. Appl. No. 62/557,068, Sep. 11, 2017 (Year: 2017).*
Ericsson: "Remaining Details on CSI-RS Design", 3GPP TSG RAN WG1 NR #91, 3GPP Draft, R1- R1-1720735 Remaining Details on CSI-RS Design, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 27, 2017-Dec. 1, 2017. Nov. 18, 2017 (Nov. 18, 2017), XP051370192, Retrieved from the Internet: URL: http://www.3gpp.org/ftp/tsg%5Fran/WG1%5FRL1/TSGR1%5F91/Docs/, [retrieved on Nov. 18, 2017], sections 2-4, the whole document.
Huawei., et al., "Remaining Issues on CSI Measurement", 3GPP TSG RAN WG1 Meeting #93, 3GPP Draft, R1-1805949, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 11, 2018 (May 11, 2018), XP051461657, Retrieved from the Internet: URL: http://www.3gpp.org/ftp/tsg%5Fran/WG1%5FRL1/TSGR1%5F93/Docs, [retrieved on May 11, 2018], Section 2.
Supplementary European Search Report—EP19861126—Search Authority—he Hauge—dated Apr. 26, 2022.
International Search Report and Written Opinion—PCT/CN2018/102240—ISA/EPO—dated Nov. 29, 2019.
International Search Report and Written Opinion—PCT/CN2018/105897—ISA/EPO—dated May 7, 2019.
Samsung: "CR on mismatch between 36.213 and 36.331", R1-161335, 3GPP TSG RAN WG1 Meeting #84, Feb. 19, 2016 (Feb. 19, 2016), 61 Pages (pp. 1-10).

* cited by examiner

CSI FOR NON-COHERENT JOINT TRANSMISSION

CROSS REFERENCE TO RELATED APPLICATIONS

This application is a national stage application under 35 U.S.C. 371 of PCT/CN2019/102240, filed Aug. 23, 2019, which claims benefit of and priority to International Patent Cooperation Treaty Application No. PCT/CN2018/105897, filed Sep. 15, 2018, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for channel state information (CSI) for multiple transmission reception point (multi-TRP) transmission such as non-coherent joint transmission (NCJT), including determining subband sizes for CSI and rules for Part II CSI omission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between in a wireless network, such as channel state information (CSI) reporting for non-coherent joint transmission (NCJT).

Certain aspects provide a method for wireless communication by a user equipment (UE). The method generally includes receiving a channel state information (CSI) report configuration. The CSI report configuration is associated with one or more CSI reference signal (RS) resources, each CSI-RS resource including a set of ports or port groups. The UE selects one or more CSI-RS resources for which to report CSI and determines whether to use a first subband size, a second size, or both for sending a CSI report, wherein the determination is based, at least in part, on a payload of the CSI report.

Certain aspects provide another method for wireless communication by a UE. The method generally includes receiving a CSI report configuration. The CSI report configuration is associated with one or more CSI-RS resources, each CSI-RS resource including a set of ports or port groups. The UE selects at least two CSI-RS resources or at least one CSI-RS resource with at least two port groups, of the configured CSI-RS resources, for which to report CSI and sends a CSI report for the selected CSI-RS resources or port groups based on the CSI report configuration. Sending the CSI report includes determining the UE has insufficient resources for the CSI report and determining to omit at least a portion of the CSI associated with all, or only one, of the at least two CSI-RS resources or port groups.

Certain aspects provide a method for wireless communication by a base station (BS). The method generally includes providing a UE with a CSI report configuration. The CSI report configuration is associated with one or more CSI-RS resources, each CSI-RS resource including a set of ports or port groups. The BS receives a CSI-RS resource indicator (CRI) from the UE indicating one or more CSI-RS resources for which the UE reports CSI and determines a first subband size, a second subband size, or both for receiving a CSI report from the UE, wherein the determination is based on at least one of: the CRI or sufficiency of available resources at the UE for sending the CSI report.

Certain aspects provide another method for wireless communication by a BS. The method generally includes providing a UE with a CSI report configuration. The CSI report configuration is associated with one or more CSI-RS resources, each CSI-RS resource including a set of ports or port groups. The BS receives a CRI from the UE indicating at least two CSI-RS resources or at least one CSI-RS resource with at least two port groups, of the configured CSI-RS resources, for which the UE reports CSI. The BS determines whether the UE omits at least a portion of the CSI based on the CRI and on whether the UE has sufficient available resources to report the CSI.

Certain aspects provide an apparatus for wireless communication. The apparatus generally includes means for receiving a CSI report configuration. The CSI report configuration is associated with one or more CSI-RS resources, each CSI-RS resource including a set of ports or port groups.

The apparatus includes means for selecting one or more CSI-RS resources for which to report CSI and means for determining whether to use a first subband size, a second size, or both for sending a CSI report, wherein the determination is based, at least in part, on a payload of the CSI report.

Certain aspects provide another apparatus for wireless communication. The apparatus generally includes means for receiving a CSI report configuration. The CSI report configuration is associated with one or more CSI-RS resources, each CSI-RS resource including a set of ports or port groups. The apparatus generally includes means for selecting at least two CSI-RS resources or at least one CSI-RS resource with at least two port groups, of the configured CSI-RS resources, for which to report CSI and sends a CSI report for the selected CSI-RS resources or port groups based on the CSI report configuration. Sending the CSI report includes determining the apparatus has insufficient resources for the CSI report and determining to omit at least a portion of the CSI associated with all, or only one, of the at least two CSI-RS resources or port groups.

Certain aspects provide another apparatus for wireless communication. The apparatus generally includes means for providing a UE with a CSI report configuration. The CSI report configuration is associated with one or more CSI-RS resources, each CSI-RS resource including a set of ports or port groups. The apparatus generally includes means for receiving a CRI from the UE indicating one or more CSI-RS resources for which the UE reports CSI and means for determining a first subband size, a second subband size, or both for receiving a CSI report from the UE, wherein the determination is based on at least one of: the CRI or sufficiency of available resources at the UE for sending the CSI report.

Certain aspects provide another apparatus for wireless communication. The apparatus generally includes means for providing a UE with a CSI report configuration. The CSI report configuration is associated with one or more CSI-RS resources, each CSI-RS resource including a set of ports or port groups. The apparatus generally includes means for receiving a CRI from the UE indicating at least two CSI-RS resources or at least one CSI-RS resource with at least two port groups, of the configured CSI-RS resources, for which the UE reports CSI. The apparatus generally includes means for determining whether the UE omits at least a portion of the CSI based on the CRI and on whether the UE has sufficient available resources to report the CSI.

Certain aspects provide an apparatus for wireless communication. The apparatus generally includes a receiver configured to receive a CSI report configuration. The CSI report configuration is associated with one or more CSI-RS resources, each CSI-RS resource including a set of ports or port groups. The apparatus generally includes at least one processor coupled with a memory and configured to select one or more CSI-RS resources for which to report CSI and determine whether to use a first subband size, a second size, or both for sending a CSI report, wherein the determination is based, at least in part, on a payload of the CSI report.

Certain aspects provide another apparatus for wireless communication. The apparatus generally includes a receiver configured to receive a CSI report configuration. The CSI report configuration is associated with one or more CSI-RS resources, each CSI-RS resource including a set of ports or port groups. The apparatus generally includes at least one processor coupled with a memory and configured to select at least two CSI-RS resources or at least one CSI-RS resource with at least two port groups, of the configured CSI-RS resources, for which to report CSI. The apparatus generally includes a transmitter configured to send a CSI report for the selected CSI-RS resources or port groups based on the CSI report configuration. The at least one processor is further configured to determine the apparatus has insufficient resources for the CSI report and determining to omit at least a portion of the CSI associated with all, or only one, of the at least two CSI-RS resources or port groups.

Certain aspects provide another apparatus for wireless communication. The apparatus generally includes a transmitter configured to provide a UE with a CSI report configuration. The CSI report configuration is associated with one or more CSI-RS resources, each CSI-RS resource including a set of ports or port groups. The apparatus generally includes a receiver configured to receive a CRI from the UE indicating one or more CSI-RS resources for which the UE reports CSI. The apparatus generally includes at least one processor coupled with a memory and configured to determine a first subband size, a second subband size, or both for receiving a CSI report from the UE, wherein the determination is based on at least one of: the CRI or sufficiency of available resources at the UE for sending the CSI report.

Certain aspects provide another apparatus for wireless communication. The apparatus generally includes a transmitter configured to provide a UE with a CSI report configuration. The CSI report configuration is associated with one or more CSI-RS resources, each CSI-RS resource including a set of ports or port groups. The apparatus generally includes a receiver configured to receive a CRI from the UE indicating at least two CSI-RS resources or at least one CSI-RS resource with at least two port groups, of the configured CSI-RS resources, for which the UE reports CSI. The apparatus generally includes at least one processor coupled with a memory and configured to determine whether the UE omits at least a portion of the CSI based on the CRI and on whether the UE has sufficient available resources to report the CSI.

Certain aspects provide a computer readable medium having computer executable code stored thereon for wireless communication. The computer readable medium generally includes code for receiving a CSI report configuration. The CSI report configuration is associated with one or more CSI-RS resources, each CSI-RS resource including a set of ports or port groups. The computer readable medium includes code for selecting one or more CSI-RS resources for which to report CSI and code for determining whether to use a first subband size, a second size, or both for sending a CSI report, wherein the determination is based, at least in part, on a payload of the CSI report.

Certain aspects provide a computer readable medium having computer executable code stored thereon for wireless communication. The computer readable medium generally includes code for receiving a CSI report configuration. The CSI report configuration is associated with one or more CSI-RS resources, each CSI-RS resource including a set of ports or port groups. The computer readable medium generally includes code for selecting at least two CSI-RS resources or at least one CSI-RS resource with at least two port groups, of the configured CSI-RS resources, for which to report CSI and sends a CSI report for the selected CSI-RS resources or port groups based on the CSI report configuration. Sending the CSI report includes determining the apparatus has insufficient resources for the CSI report and determining to omit at least a portion of the CSI associated with all, or only one, of the at least two CSI-RS resources or port groups.

Certain aspects provide a computer readable medium having computer executable code stored thereon for wireless communication. The computer readable medium generally includes code for providing a UE with a CSI report configuration. The CSI report configuration is associated with one or more CSI-RS resources, each CSI-RS resource including a set of ports or port groups. The computer readable medium generally includes code for receiving a CRI from the UE indicating one or more CSI-RS resources for which the UE reports CSI and code for determining a first subband size, a second subband size, or both for receiving a CSI report from the UE, wherein the determination is based on at least one of: the CRI or sufficiency of available resources at the UE for sending the CSI report.

Certain aspects provide a computer readable medium having computer executable code stored thereon for wireless communication. The computer readable medium generally includes code for providing a UE with a CSI report configuration. The CSI report configuration is associated with one or more CSI-RS resources, each CSI-RS resource including a set of ports or port groups. The computer readable medium generally includes code for receiving a CRI from the UE indicating at least two CSI-RS resources or at least one CSI-RS resource with at least two port groups, of the configured CSI-RS resources, for which the UE reports CSI. The computer readable medium generally includes code for determining whether the UE omits at least a portion of the CSI based on the CRI and on whether the UE has sufficient available resources to report the CSI.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
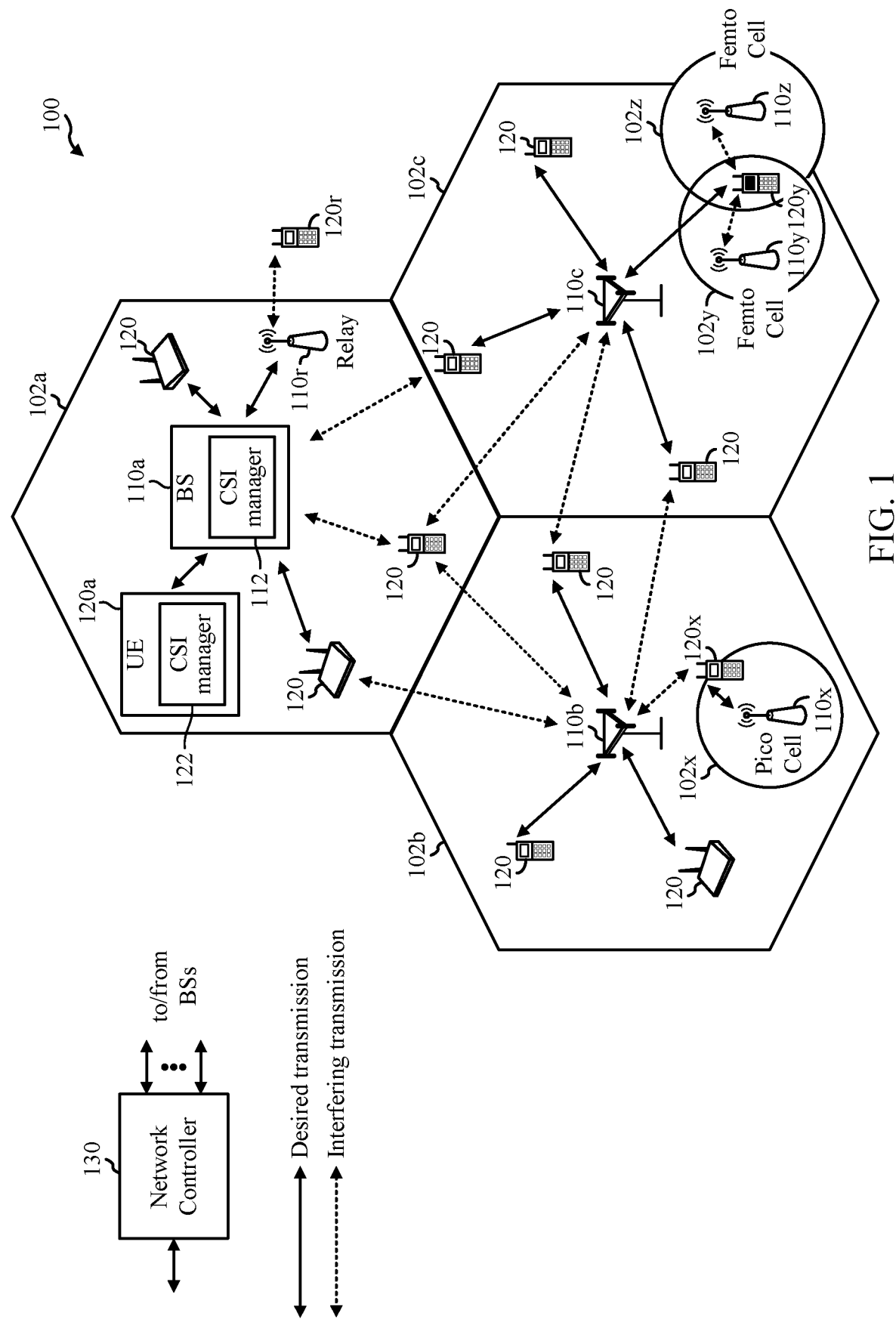
FIG. 1 is a block diagram conceptually illustrating an example telecommunications system, in accordance with certain aspects of the present disclosure.

Aspects of the present disclosure provide apparatus, methods, processing systems, and computer readable mediums for channel state information (CSI) for multiple transmission reception point (multi-TRP) transmission such as non-coherent joint transmission (NCJT), including determining subband sizes for CSI and rules for Part II CSI omission.

For NCJT, the user equipment (UE) can select multiple CSI reference signal (CSI-RS) resources, or a CSI-RS with multiple ports, for CSI reporting. Thus, the UE may be configured to report CRI indicating the selected resources along with CSI including rank indicator (RI), precoding matrix indicator (PMI), and channel quality indicator (CQI) for each of the selected resources and/or port groups. Thus, the overhead for the CSI report may be large. Therefore, techniques for reducing the overhead of the CSI and/or omission rules for the CSI are desirable.

Accordingly, aspects of the present disclosure provide techniques for determining subband sizes for CSI and rules for Part II CSI omission.

The following description provides examples of CSI for NCJT, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

FIG. 1 illustrates an example wireless communication network 100 in which aspects of the present disclosure may be performed. For example, the wireless communication network 100 may be a New Radio (NR) or 5G network.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

As shown in FIG. 1, the BS 110a in the wireless communication network 100 may have a CSI reporting manager 112 configured to perform certain aspects of the disclosure. In some examples, the CSI reporting manager 112 may configure a UE 120a with a CSI report configuration. The CSI report configuration may configure CSI reference signal (CSI-RS) resources for a multi-TRP transmission, such as NCJT. The UE 120a may have a CSI reporting manager 122 configured to perform certain aspects of the disclosure. The CSI reporting manager 122 may measure the channel associated with the CSI-RS for the ports of triggered resources and select preferred CSI-RS resources. In some example, the CSI reporting manager 122 may select multiple CSI-RS or a CSI-RS resource that has multiple port groups. In some examples, a subband size is dedicated for the NCJT. Thus, the CSI reporting manager 122 and the CSI reporting manager 112 can determine the subband size for the CSI report based on the payload/content of the CSI report. The determination may additionally or alternatively be based on the sufficiency of the resources available at the UE 120a to transmit the CSI report. In some examples, the CSI reporting manager 122 omits at least a portion of the CSI from the CSI report. The CSI reporting manager 122 may omit the CSI based on sufficiency of the resources available at the UE 120a to transmit the CSI report.

Figure 2:
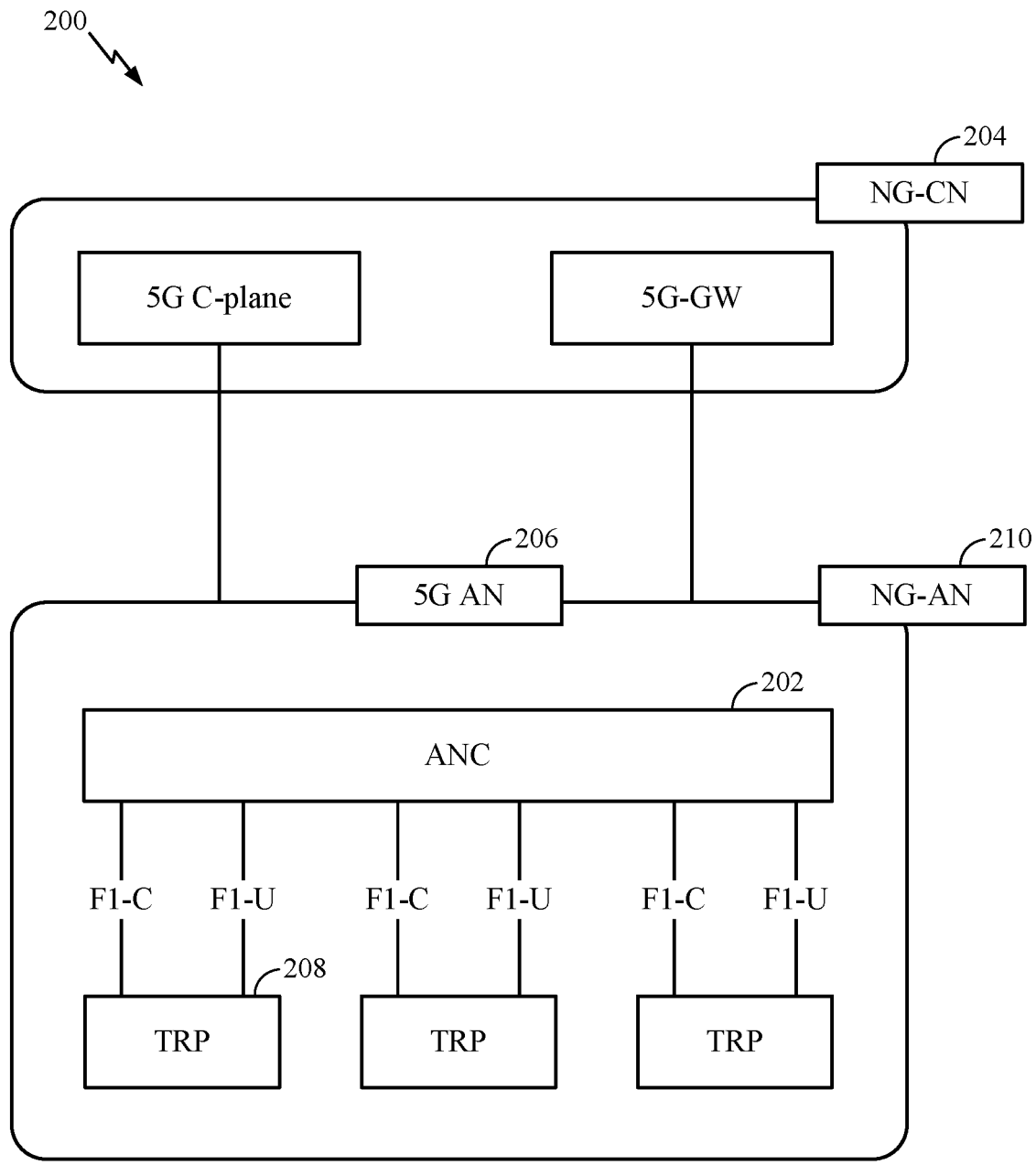
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.). The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter). The logical architecture of distributed RAN 200 may share features and/or components with LTE. For example, next generation access node (NG-AN) 210 may support dual connectivity with NR and may share a common fronthaul for LTE and NR. The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
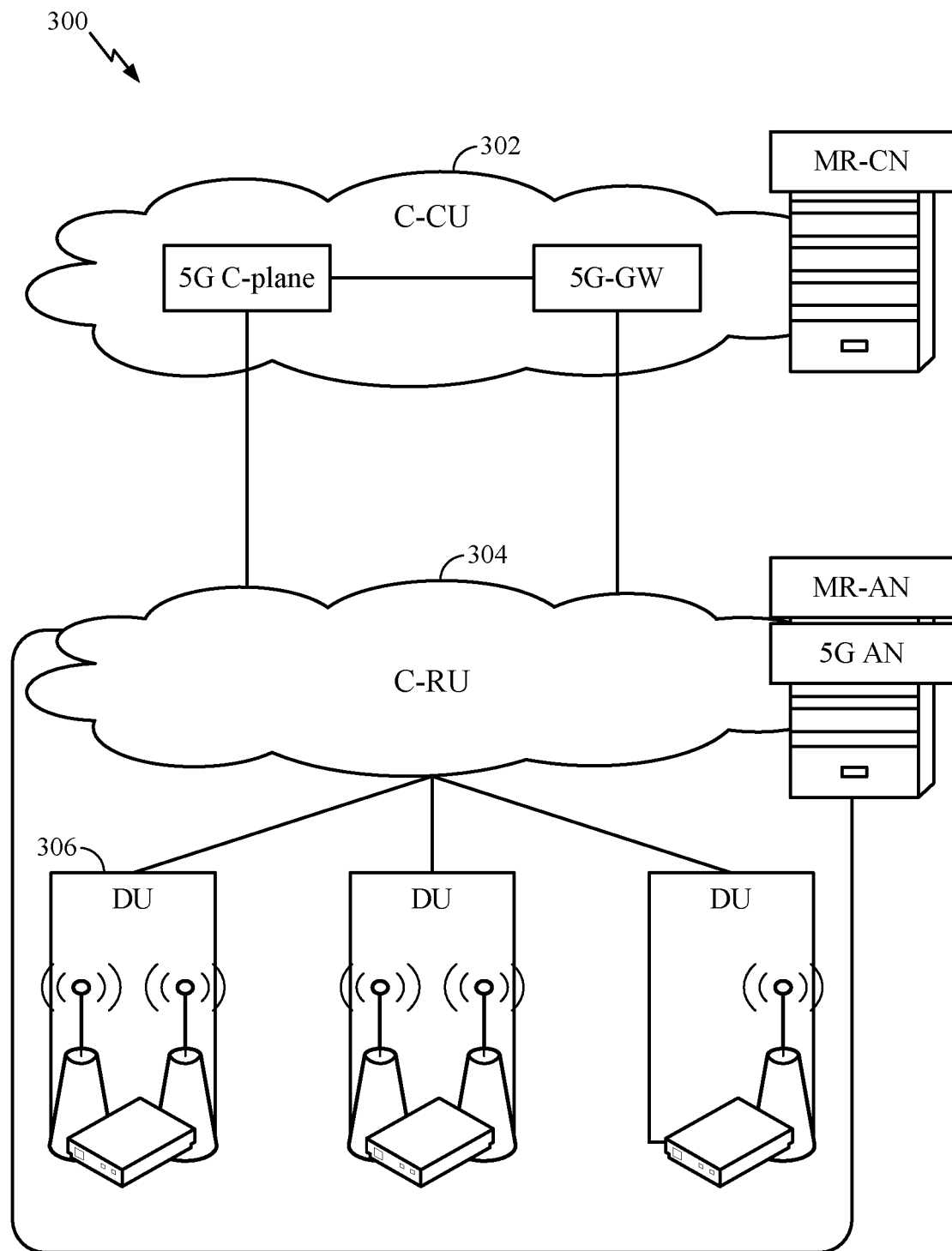
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity. A centralized RAN unit (C-RU) 304 may host one or more ANC functions. Optionally, the C-RU 304 may host core network functions locally. The C-RU 304 may have distributed deployment. The C-RU 304 may be close to the network edge. A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
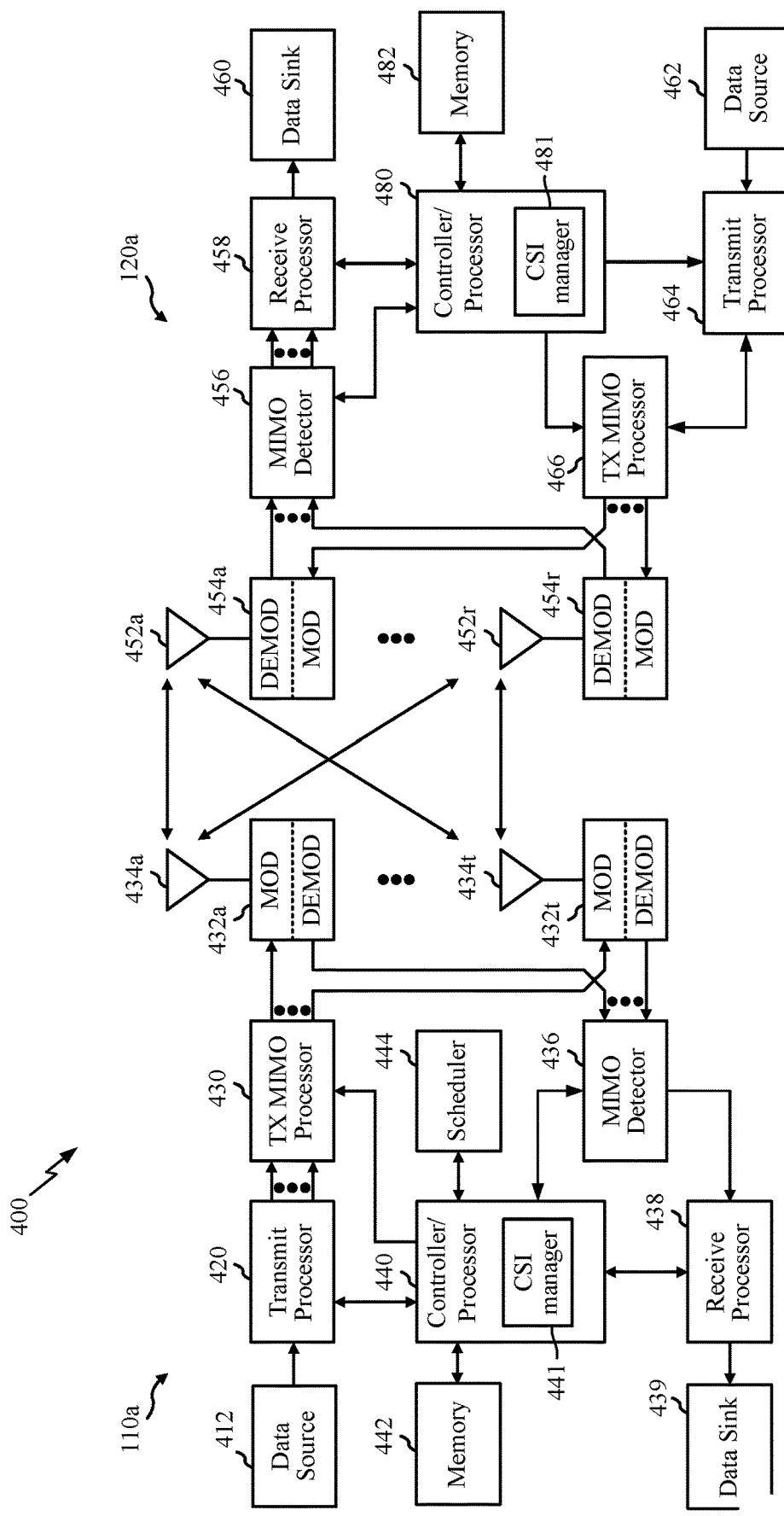
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein for CSI reporting with a dedicated subband size for NOT and/or Part II CSI omission rules.

At the BS 110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120*a*, the antennas 452*a* through 452*r* may receive the downlink signals from the BS 110*a* and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the BS 110*a*. At the BS 110*a*, the uplink signals from the UE 120 may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. As shown in FIG. 4, the controller/processor 440 of the BS 110*a* includes CSI reporting manager 441 that may be configured to perform aspects of the present disclosure. The controller/processor 480 of the UE 120*a* may include a CSI manager reporting 481. The memories 442 and 482 may store data and program codes for BS 110*a* and UE 120*a*, respectively. A scheduler 444 may schedule UEs for data transmission on the downlink and/or uplink.

Figure 5:
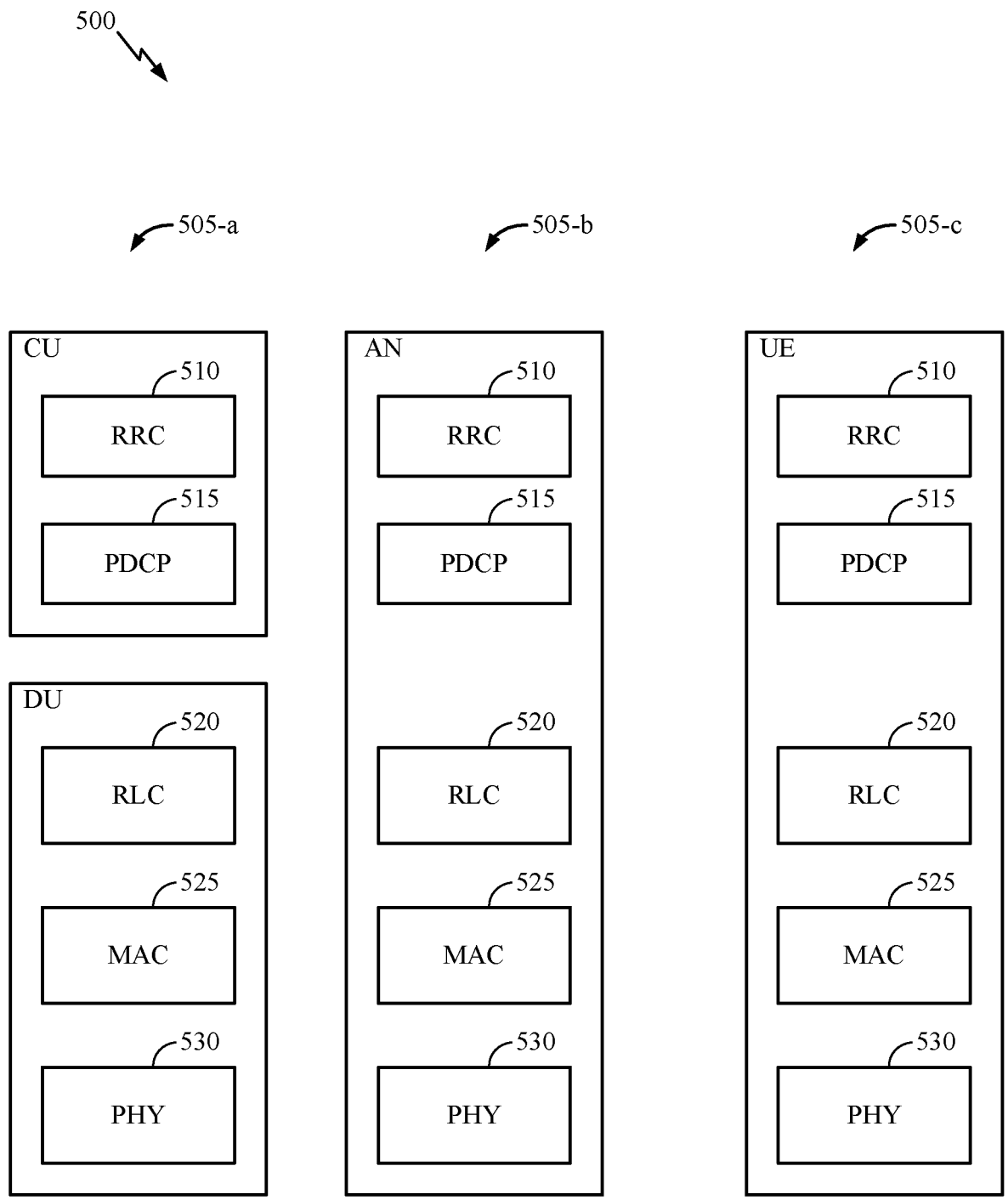
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
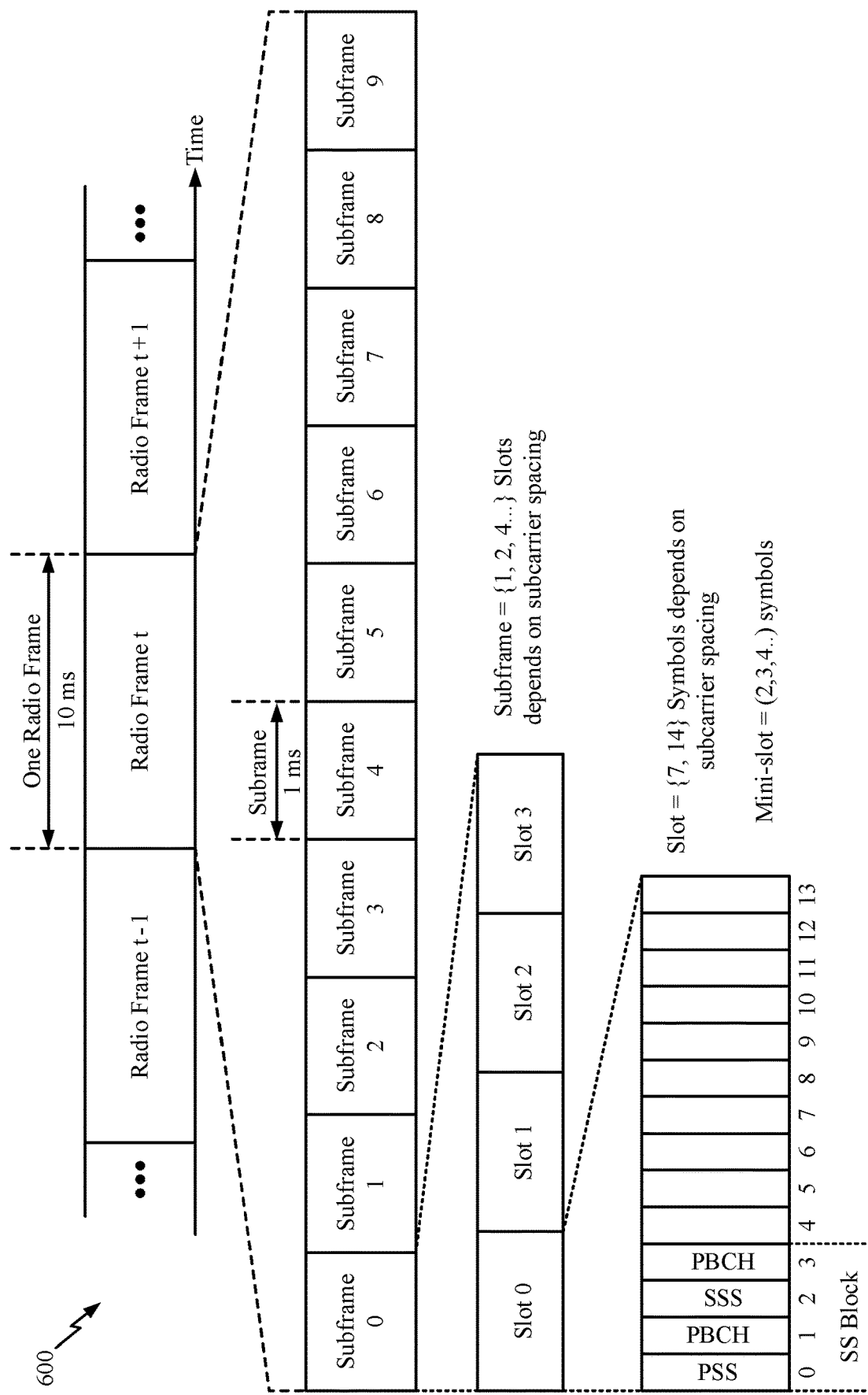
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example CSI for Non-Coherent Joint Transmission

In certain wireless communication networks (e.g., new radio), non-coherent joint transmissions (NCJTs) may be used to provide multiple-input multiple-output (MIMO), multiple-user (MU) MIMO, and/or coordinated multi-point (CoMP) communications. The NCJTs may be from multiple transmission-reception points (multi-TRP), multiple panels (multi-panel) of a TRP, or a combination thereof. Coherent joint transmission requires synchronization among transmission reception points (TRPs). However, for distributed TRPs, the precoders cannot be jointly designed and, therefore, the TRPs are not synchronized. Instead, each TRP derives the precoder independently, without knowledge of the precoders used by the other TRPs. Thus, the joint transmission is non-coherent. Using NCJT, TRPs can transmit the same data to a UE to improve the transmission reliability/coverage. Also, using NCJT the TRPs can transmit different data streams to the UE to improve throughput.

CSI may refer to known channel properties of a communication link. The CSI may represent the combined effects of, for example, scattering, fading, and power decay with distance between a transmitter and receiver. Channel estimation using the pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The network (e.g., a base station (BS)), may configure UEs for CSI reporting. For example, the BS may configure the UE with a CSI report configuration (sometimes referred to as a 'CSI report setting') or with multiple CSI report configurations. The CSI report configuration may be provided to the UE via higher layer signaling, such as radio resource control (RRC) signaling. The CSI report configurations may be associated with CSI-RS resources for channel measurement (CM), interference measurement (IM), or both. The CSI report configuration configures CSI-RS resources (sometimes referred to as the 'CSI-RS resource setting') for measurement. The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. In some examples, a Type I single panel codebook, a Type I multi-panel codebook, or a Type II single panel codebook may be used for the CSI reporting. Regardless which codebook is used, the CSI report may include a channel quality indicator (CQI), a precoding matrix indicator (PMI), a CSI-RS resource indicator (CRI), and/or a rank indicator (RI). The structure of the PMI may vary based on the codebook. The CRI, RI, and CQI may be in a first part (Part I) and the PMI may be in a second part (Part II) of the CSI report. For the Type I single panel codebook, the PMI consists of a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state. The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resources. The UE reports the CSI feedback for the selected CSI-RS resource.

Figure 7:
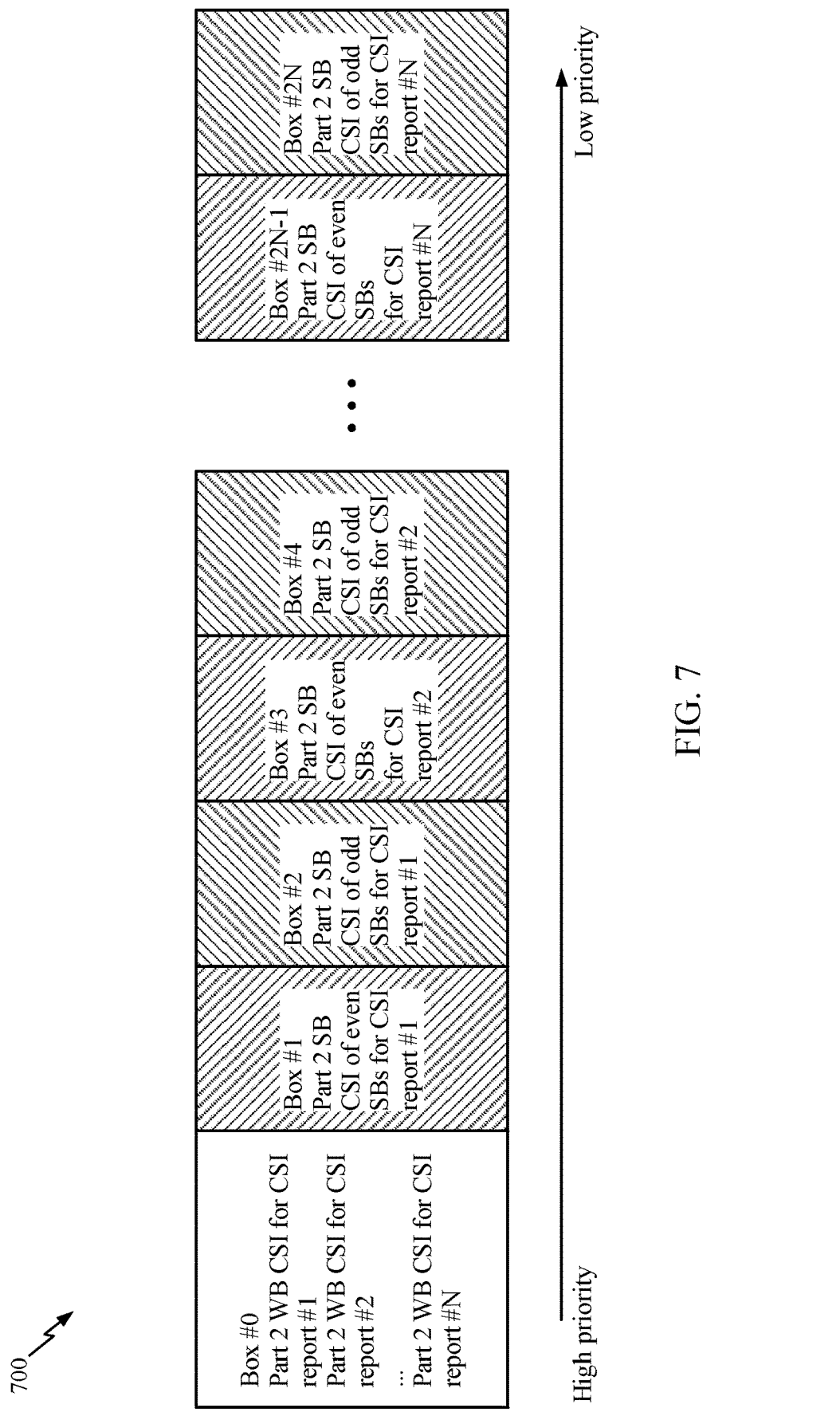
FIG. 7 is a diagram showing example priority rules for channel state information (CSI) omission, in accordance with certain aspects of the present disclosure.

In certain systems, when the allocated uplink resource is insufficient for transmitting the CSI report with the configured CSI report quantities, at least some of the Part II CSI may be omitted. Multiple CSI reports may be carried on one PUSCH. The omissions of the Part II CSI may start from the lowest priority, according to priority rules. FIG. 7 is a diagram showing example priority rules for CSI omission, in accordance with certain aspects of the present disclosure.

In some systems, the CSI report trigger state may trigger CSI report associated with NCJT. The CSI report configuration may configure the UE to report CSI for multiple CSI-RS resources and/or CSI-RS resources having more than one port group. Thus, the UE can select multiple resources and/or a CSI-RS resource having more than one port group (e.g., two) and report CRI indicating the selected resources along with RI, PMI, and CQI for each of the selected resources and/or port groups. Thus, the overhead for the CSI report may be large. Therefore, techniques for reducing the overhead of the CSI and/or omission rules for the CSI are desirable.

Accordingly, aspects of the present disclosure provide techniques for CSI for multiple transmission reception point (multi-TRP) transmission such as NCJT, including determining subband sizes for CSI and rules for Part II CSI omission.

Example Subband Size Determination

Figure 8:
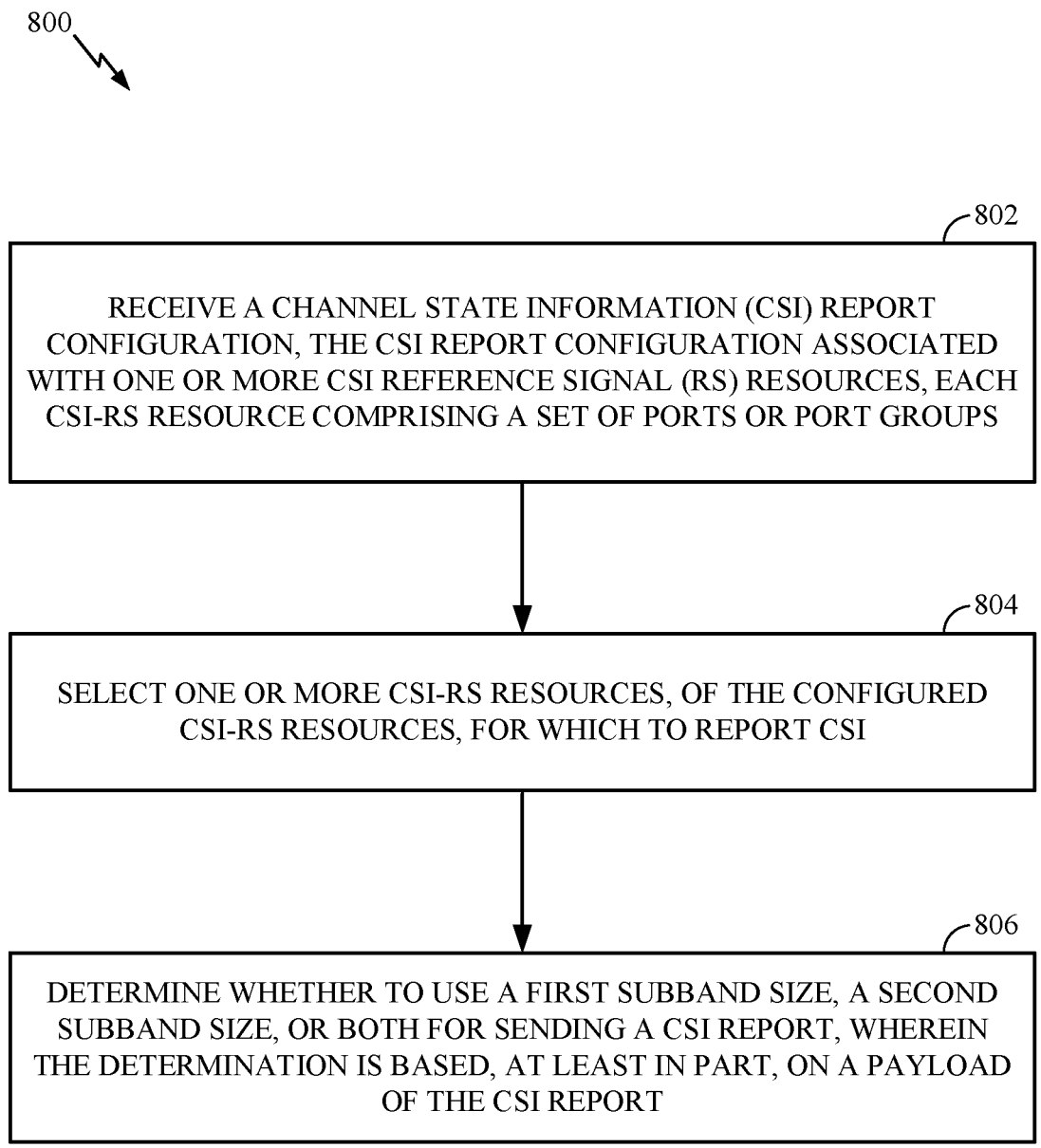
FIG. 8 is a flow diagram illustrating example operations by a UE for CSI subband determination, in accordance with certain aspects of the present disclosure.

According to certain aspects, a subband size may be dedicated for NCJT CSI. FIG. 8 is a flow diagram illustrating example operations 800 for wireless communication, in accordance with certain aspects of the present disclosure. The operations 800 may be performed, for example, by a UE (e.g., such as a UE 120 in the wireless communication network 100) for CSI subband determination.

The operations 800 may begin, at 802, by receiving a CSI report configuration (e.g., from a BS such as a BS 110 in the wireless communication network 100). The CSI report configuration is associated with one or more CSI-RS resources, each CSI-RS resource including a set of ports or port groups. For example, the ports of the CSI-RS resource can be categorized in multiple port groups or in one port group. If the ports of the CSI-RS resource are categorized into multiple port groups, the different port groups may correspond to different QCL (quasi-colocation) configurations. In some examples, each port group associated with a particular QCL configuration may correspond to a set of ports from a different TRP. In some examples, the ports for each CSI-RS resources may correspond to a set of ports from a different TRP. The CSI report configuration may configure the UE to select/report multiple (e.g., two) CSI-RS resources or port groups.

At 804, the UE selects one or more CSI-RS resources, of the configured CSI-RS resources, for which to report CSI. For example, one or more of the CSI-RS resources may be activated/triggered by a trigger state. The UE may receive CSI-RS and measure the channel associated with the ports of the triggered resources. Based on the measurements, the UE may select preferred resources (e.g., based on CQI or spectral efficiency). The UE may select multiple CSI-RS resources and/or a CSI-RS resource with multiple port groups. The resources may be associated with a multi-TRP transmission, such as a NCJT transmission.

The UE may send the CSI report. The CSI report may include the CRI indicating the selected resources along with RI, PMI, and CQI for each of the selected resources. At 806, the UE determines whether to use a first subband size, a second size, or both for sending a CSI report, wherein the determination is based, at least in part, on a payload of the CSI report. As discussed in more detail below, the determination of the subband size may be based on the number of the CSI-RS resources or port groups in the selected CSI-RS resources selected for the CSI report, the number of RIs in the CSI report, the number of PMIs, or a sufficiency of resources available for the UE to transmit the content of the CSI report.

According to certain aspects, there may be two subband sizes per CSI report configuration. For example, the first subband size may be for CSI reports for single TRP transmissions (i.e., for a single CSI-RS resource and port group) and the second subband size may be for multi-TRP transmissions (i.e., for multiple CSI-RS resources or a CSI-RS resource with multiple port groups). The second subband size may be wideband.

In some examples, the subband sizes may be explicitly configured. In some examples, the first subband size may be explicitly configured, and the second subband size is derivable (by both the UE and the BS) from the first subband size. In some examples, the second subband size is dedicated for NCJT.

According to certain aspects, the UE may determine whether to transmit PMI using the first or second subband size based on whether the CSI report is for a single TRP or multi-TRP transmission. The UE may determine to use the first subband size when only one CSI-RS resource with only one port group is selected (and one PMI, RI, CQI reported). The UE may determine to use the second subband size when more than one CSI-RS resource or a CSI-RS resource with more than one port group is selected (and multiple PMI, RI, CQI reported). In some examples, the UE may use the second subband size for all PMI or only for PMI associated with the weakest CQI, while transmitting the other PMI using the first subband size.

According to certain aspects, the UE may determine whether to transmit PMI using the first or second subband size based on whether the UE has sufficient available resources for transmitting the CSI report. For example, if the UE has sufficient resources, the UE may send all PMI using the first subband size, regardless whether the PMI is for single or multi-TRP. If the UE does not have sufficient resources, the UE may transmit all PMI using the second subband size, regardless whether the PMI is for single or multi-TRP. Or, if the UE does not have sufficient resources, the UE may transmit the PMI associated with a weaker CQI using the second subband size and transmit the other PMI using the first subband size.

In an example, the UE may report a single PMI for a single CSI-RS resource in the CSI report. If the UE has insufficient resources for the CSI report, the UE uses the second subband size. A type II CSI report may have a very large payload. In some examples, the BS may configure the first subband size as 4, and the second subband size may be equal to 8, or wideband. Although the UE reports CSI for single TRP, the UE may fall back to the second subband size when it has insufficient resources.

Figure 9:
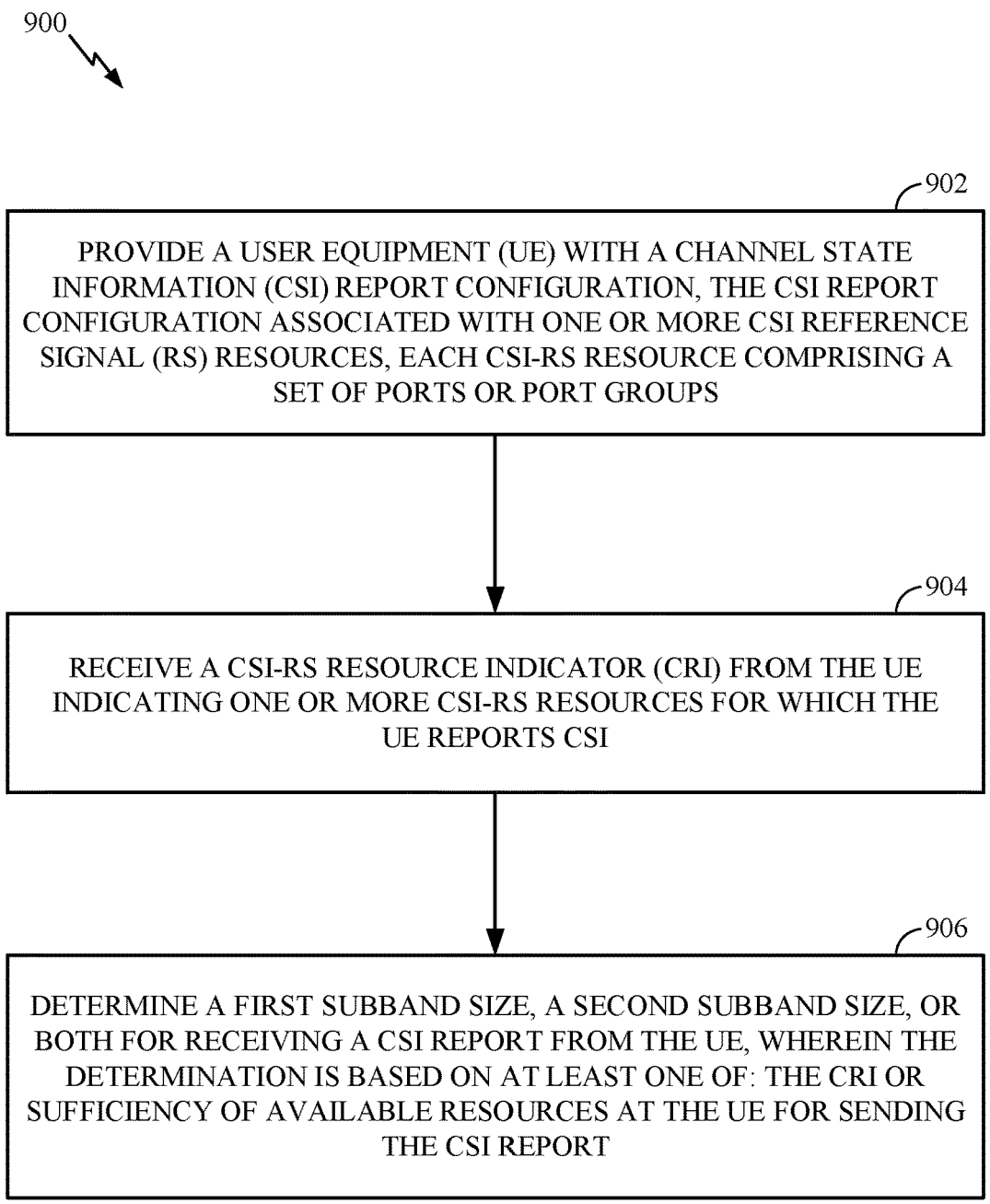
FIG. 9 is a flow diagram illustrating example operations by a BS for CSI subband determination, in accordance with certain aspects of the present disclosure.

FIG. 9 is a flow diagram illustrating example operations 900, in accordance with certain aspects of the present disclosure. The operations 900 may be performed by a BS for CSI subband determination. The operations 900 may be complementary to the operations 800 performed by the UE.

The operations 900 may begin, at 902, by providing a UE with a CSI report configuration. As discussed above, the CSI report configuration is associated with one or more CSI-RS resources, each CSI-RS resource including a set of ports or port groups.

At 904, the BS receives a CRI from the UE indicating one or more CSI-RS resources for which the UE reports CSI. For example, the BS may signal/configure trigger states activating/triggering one or more of the configured CSI-RS. The BS may send CSI-RS using one or more of the triggered CSI-RS resources. Based on the CSI-RS, the UE selects the CSI-RS resources for the CSI report.

At 906, the BS determines a first subband size, a second subband size, or both for receiving a CSI report from the UE, wherein the determination is based on the CRI and/or sufficiency of available resources at the UE for sending the CSI report. The BS may receive a CSI report from the UE using the determined subband size(s). The BS configured the first subband size. The BS may also configure the second subband size, or the BS may derive the second subband size based on the first subband size. The second subband size may be wideband.

According to certain aspects, the BS determines the subband size based on the CRI. For example, when the CRI indicates single TRP (e.g., one CSI-RS resource with one port group), the BS determines the first subband size. When the CRI indicates multi-TRP (e.g. multiple CSI-RS resources or a CSI-RS resource having multiple port groups), the BS determines the second subband size. In some examples, when the CRI indicates multi-TRP, the BS may determine the second subband size for all TRPs or the BS may determine the second subband size for the PMI associated with a weaker CQI and determine the first subband size for the other PMI(s).

According to certain aspects, the BS determines the subband size based on the sufficiency of the resources available at the UE for transmitting the CSI report. For example, based on the resource allocation and the CRI, the BS may be able to determine whether the UE has sufficient uplink resources (e.g., sufficient PUSCH/PUCCH resources) for transmitting all of the CSI for the resources indicated in the CRI. When the BS determines the UE has sufficient resources, the BS may determine the first subband size is used for all PMI, regardless whether the CSI report is for single- or multi-TRP. When the BS determine the UE has insufficient resources, the BS may determine the second subband size is used for all PMI or the second subband size is used for PMI associated with a weaker CQI and the first subband size is used for the other PMIs, regardless whether the CSI report is for single- or multi-TRP.

Example Part II CSI Omission Rules

Figure 10:
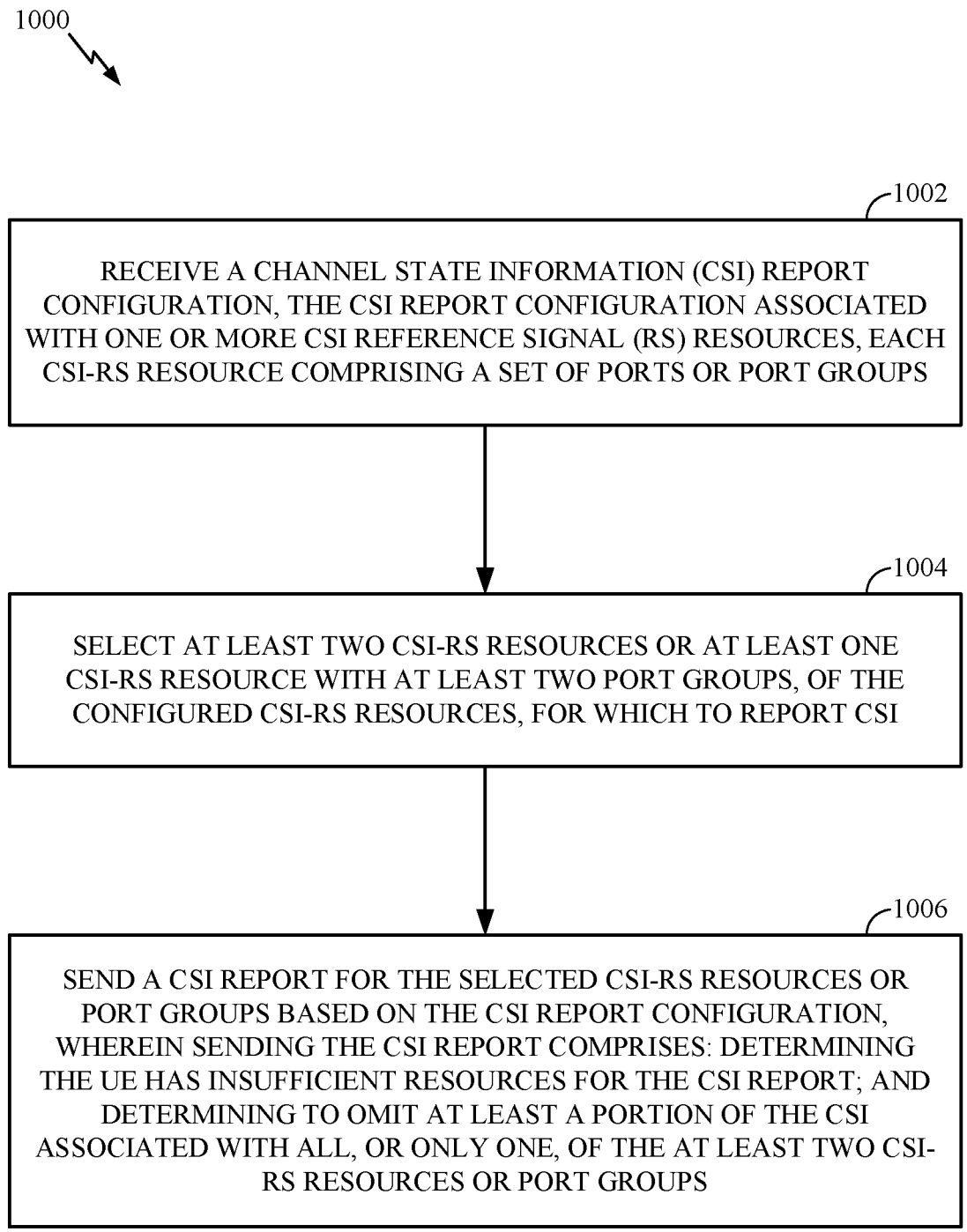
FIG. 10 is a flow diagram illustrating example operations by a UE for CSI omission, in accordance with certain aspects of the present disclosure.

According to certain aspects, some CSI may be omitted from the CSI report, for example, to reduce overhead. FIG. 10 is a flow diagram illustrating example operations 1000, in accordance with certain aspects of the present disclosure. The operations 1000 may be performed, for example, by a UE (e.g., such as a UE 120 in the wireless communication network 100) for CSI omission.

The operations 1000 may begin, at 1002, by receiving a CSI report configuration. As discussed above, the CSI report configuration is associated with one or more CSI-RS resources, each CSI-RS resource including a set of ports or port groups. As discussed above, the CSI report configuration configures the UE to report CRI, along with RI, PMI (e.g., subband and/or wideband PMI), and CQI for each selected CSI-RS resource and/or each port group of a selected CSI-RS resource.

At 1004, the UE selects at least two CSI-RS resources or at least one CSI-RS resource with at least two port groups, of the configured CSI-RS resources, for which to report CSI. For example, the CSI may be reported for a multi-TRP transmission, such as a NCJT transmission. Each CSI-RS resource and/or each port group may be associated with a different TRP of the joint transmission. One or more of the configured CSI-RS resources may be triggered by a trigger state. The UE receives CSI-RSs associated with the triggered resources, measures the channel associated with the CSI-RSs, and selects the resources based on the measurements (e.g., having the best CQI).

At 1006, the UE sends a CSI report for the selected CSI-RS resources or port groups based on the CSI report configuration. Sending the CSI report includes determining the UE has insufficient resources for the CSI report and determining to omit at least a portion of the CSI associated with all, or only one, of the at least two CSI-RS resources or port groups. For example, the UE determines to transmit all of the CSI if the UE has sufficient resources; and the UE determines to omit at least a portion of the CSI when the UE has insufficient resources. The UE may omit the CSI according to a rule. The UE may omit the subband PMIs of all of the PMIs or only the subband PMI of the PMI associated with the weaker CQI. The UE may omit the CSI for even or odd resource blocks (RB) according to an example rule.

Figure 11:
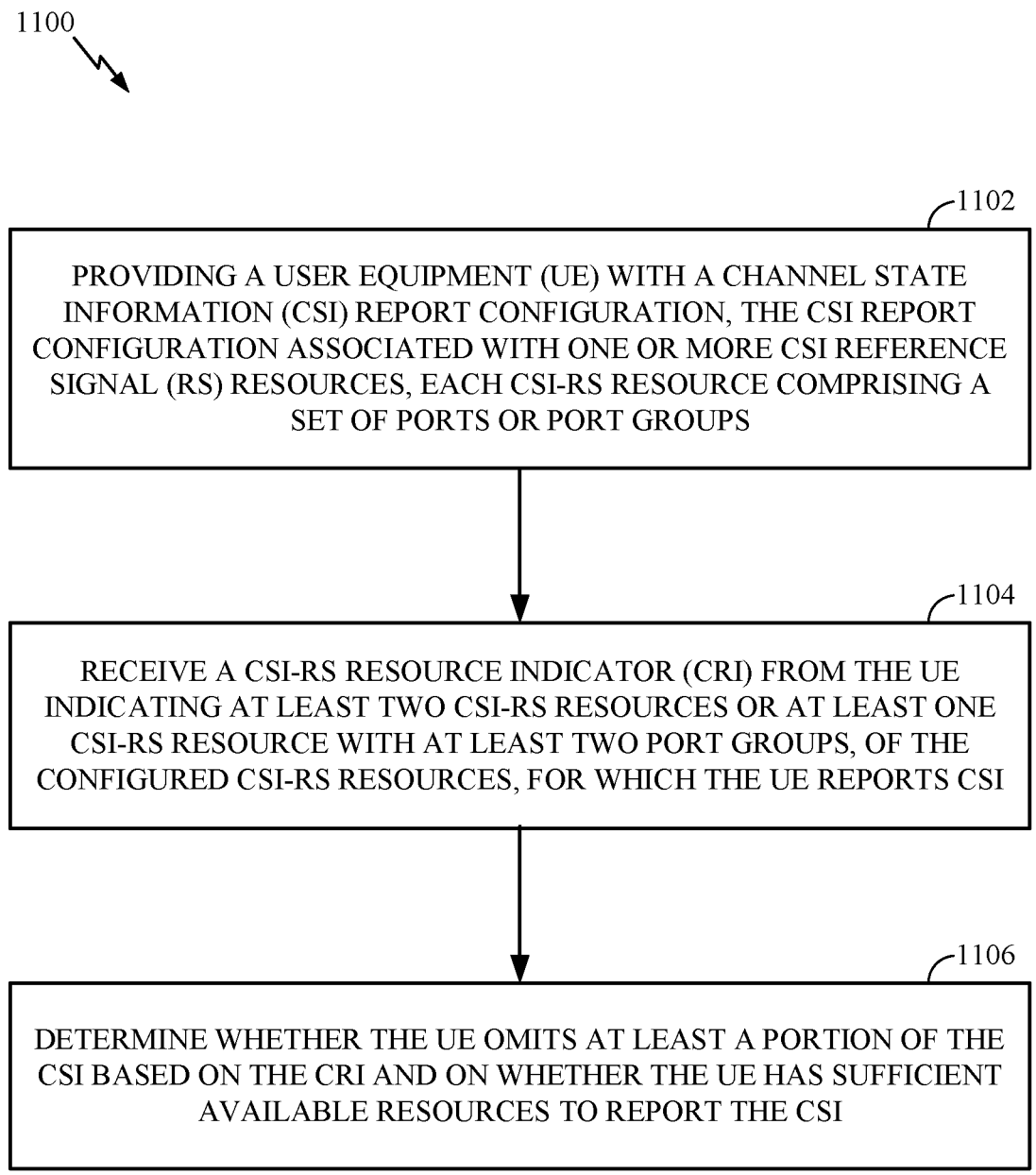
FIG. 11 is a flow diagram illustrating example operations by a BS for determining CSI omission, in accordance with certain aspects of the present disclosure.

FIG. 11 is a flow diagram illustrating example operations 1100, in accordance with certain aspects of the present disclosure. The operations 1100 may be performed, for example, by a BS (e.g., such as a BS 110 for wireless communication network 100) for determining CSI omission. The operations 1100 may be complementary to the operations 1000 by the UE.

The operations 1100 may begin, at 1102, by providing a UE with a CSI report configuration. As discussed above, the CSI report configuration is associated with one or more CSI-RS resources, each CSI-RS resource including a set of ports or port groups.

At 1104, the BS receives a CRI from the UE indicating at least two CSI-RS resources or at least one CSI-RS resource with at least two port groups, of the configured CSI-RS resources, for which the UE reports CSI. For example, the resources may be for a multi-TRP transmission, such as a NCJT transmission. The set of ports of each CSI-RS resource and/or each port group may be associated with a different TRP involved in the joint transmission.

At 1106, the BS determines whether the UE omits at least a portion of the CSI based on the CRI and on whether the UE has sufficient available resources to report the CSI. For example, the BS determines to all of the CSI is transmitted (i.e., none omitted) if the UE has sufficient resources; and the BS determines at least a portion of the CSI is omitted when the UE has insufficient resources. The omitted CSI may be determined according to a rule. The subband PMIs of all of the PMIs or only the subband PMI of the PMI associated with the weaker CQI may be omitted. The CSI for even or odd RBs may be omitted according to an example rule.

Figure 12:
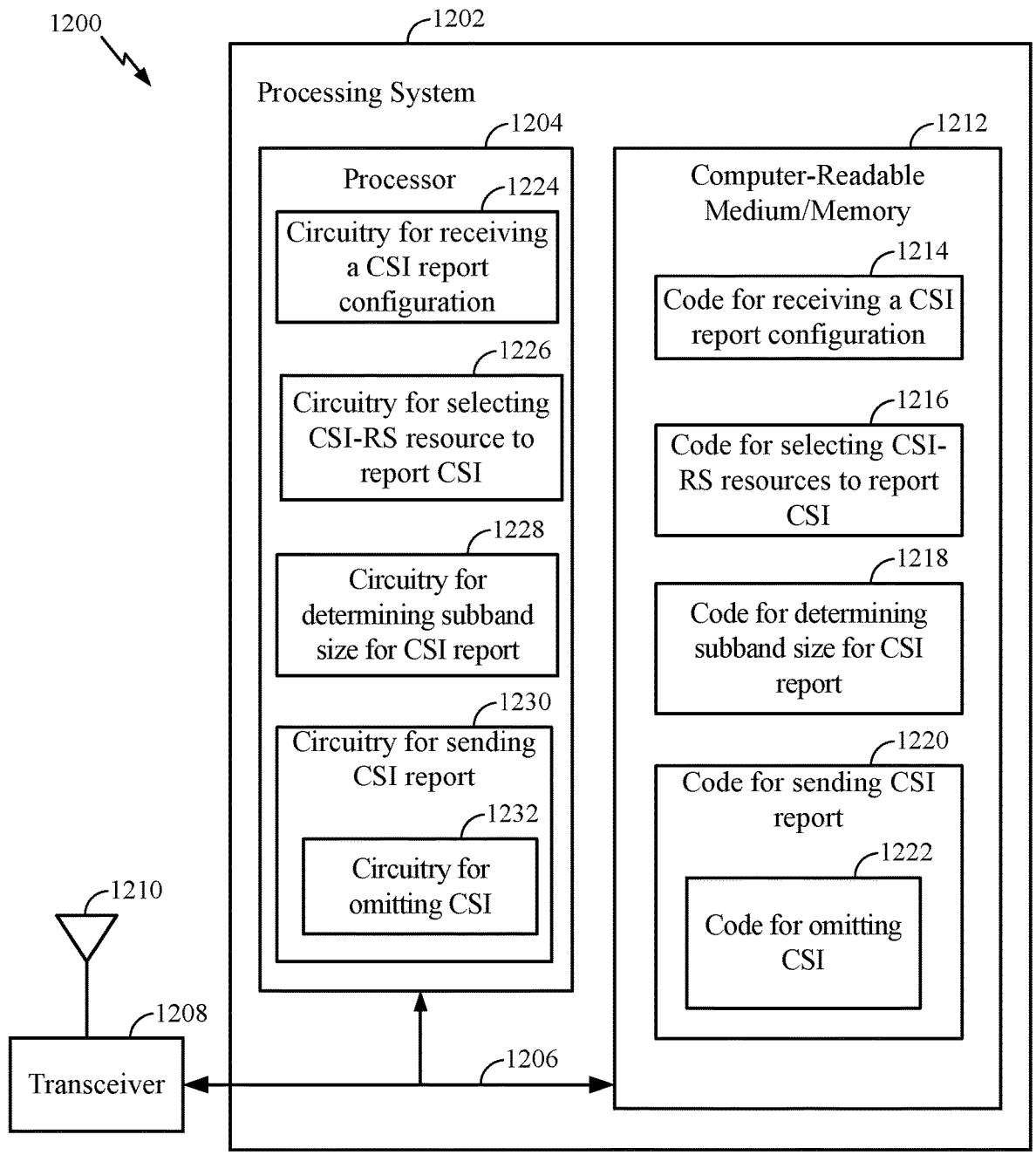
FIG. 12 illustrates an example communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 8 and/or FIG. 10. In some examples not all of the components may be included. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer executable code) that when executed by the processor 1204, cause the processor 1204 to perform the operations illustrated in FIG. 8 and FIG. 10, or other operations for performing the various techniques discussed herein. In certain aspects, computer-readable medium/memory 1212 stores code 1214 for receiving a CSI report configuration; code 1216 for selecting CSI-RS resources; code 1218 for determining a subband size for CSI report; and code 1218 for sending a CSI report. In some examples, the code 1218 for sending a CSI report includes code 1220 for omitting CSI. In certain aspects, the processor 1204 has circuitry configured to implement the code stored in the computer-readable medium/memory 1212. The processor 1204 includes circuitry 1222 for receiving a CSI report configuration; circuitry 1224 for selecting CSI-RS resources; circuitry 1226 for determining a subband size; and circuitry 1228 for sending a CSI report. The circuitry 1228 for sending the CSI report may include circuitry 1230 for omitting CSI. The transceiver 1208 may receive the CSI report configuration, receive CSI-RS, send the CSI report, etc.

Figure 13:
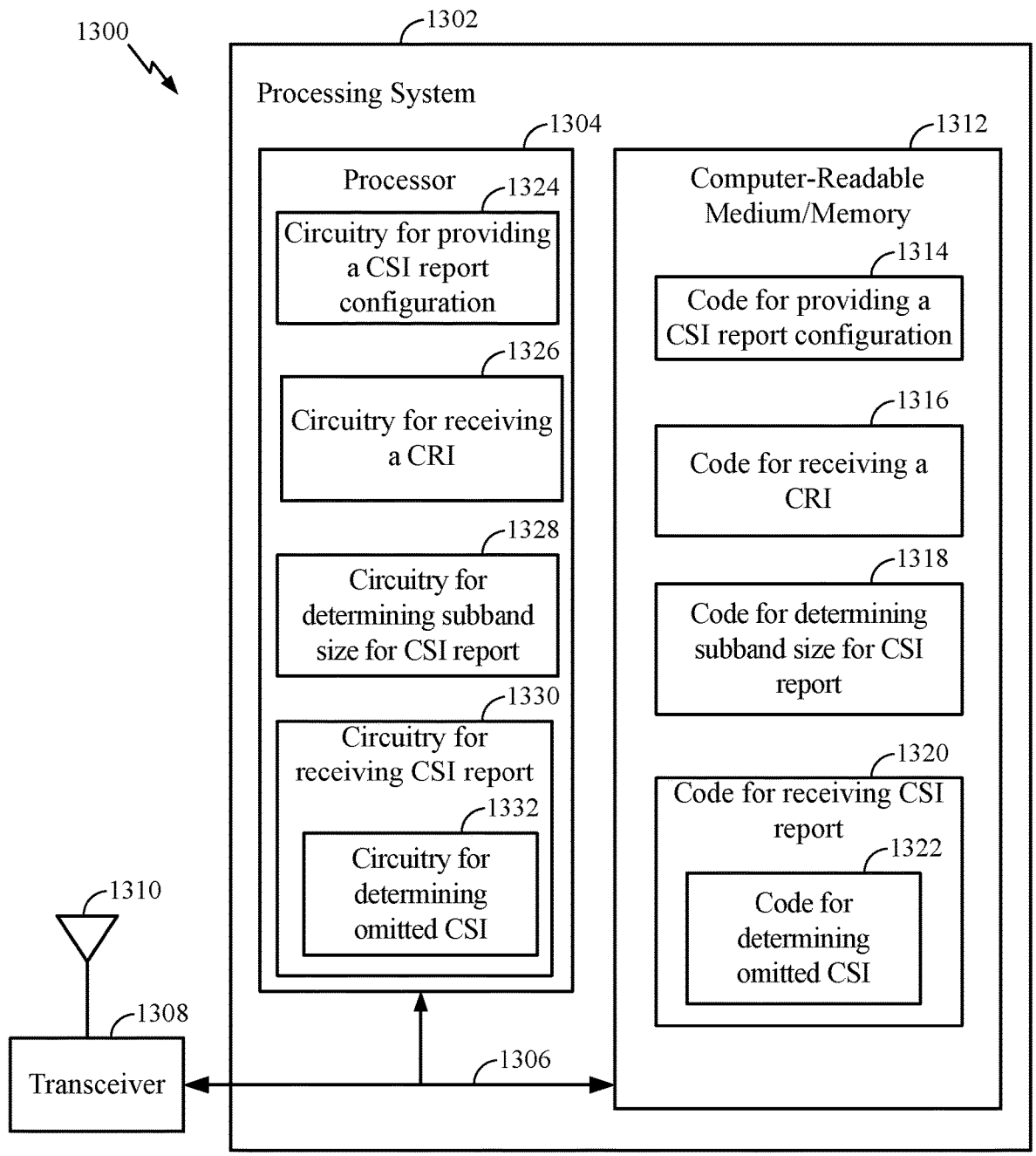
FIG. 13 illustrates an example communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9 and/or FIG. 11. In some examples not all of the components may be included. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer executable code) that when executed by the processor 1304, cause the processor 1304 to perform the operations illustrated in FIG. 9 and/or FIG. 11, or other operations for performing the various techniques discussed herein. In certain aspects, computer-readable medium/memory 1312 stores code 1314 for providing a CSI report configuration; code 1316 for receiving a CRI; code 1318 for determining a subband size; and code 1318 for receiving a CSI report. In some examples, the code 1318 for receiving a CSI report includes code 1320 for determining omitted CSI. In certain aspects, the processor 1304 has circuitry configured to implement the code stored in the computer-readable medium/memory 1312. The processor 1304 includes circuitry 1322 for providing a CSI report configuration; circuitry 1324 for receiving CRI; circuitry 1326 for determining a subband size; and circuitry 1328 for receiving a CSI report. The circuitry 1328 for receiving the CSI report may include circuitry 1330 for determining omitted CSI. The transceiver 1308 may transmit the CSI report configuration, transmit CSI-RS, receive the CSI report, etc.

Example Aspects

In a first aspect, a method for wireless communications by a user equipment (UE), comprises receiving a channel state information (CSI) report configuration, the CSI report configuration associated with one or more CSI reference signal (RS) resources, each CSI-RS resource comprising a set of ports or port groups; selecting one or more CSI-RS resources, of the configured CSI-RS resources, for which to report CSI; and determining whether to use a first subband size, a second size, or both for sending a CSI report, wherein the determination is based, at least in part, on a payload of the CSI report.

In a second aspect, alone or in combination with the first aspect, the determining is based on the number of the CSI-RS resources or port groups in the selected CSI-RS resources selected for the CSI report, the number of rank indicators (RIs) in the CSI report, the number of precoding matrix indicators (PMI), or a sufficiency of resources available for the UE to transmit the content of the CSI report.

In a third aspect, alone or in combination with one or more of the first and second aspects, the CSI report configuration configures the UE to report at least a CSI resource indicator (CRI) indicating the one or more selected CSI-RS resources and, for each selected CSI-RS resource or port group in the selected CSI-RS resources, a rank indicator (RI), a precoding matrix indicator (PMI), and a channel quality indicator (CQI).

In a fourth aspect, alone or in combination with one or more of the first through third aspects, the method further comprises receiving one or more CSI-RS; measuring the channel associated with the ports associated with triggered CSI-RS resources, wherein the one or more CSI-RS resources are selected based on the measurements; and sending a CSI report based on the measurements using the determined first subband size, second subband size, or both.

In a fifth aspect, alone or in combination with one or more of the first through fourth aspects, the CSI report configuration explicitly configures the first subband size; and the CSI report configuration explicitly configures the second subband size or the second subband size is derivable from the first subband size.

In a sixth aspect, alone or in combination with one or more of the first through fifth aspects, the second subband size is wideband.

In a seventh aspect, alone or in combination with one or more of the first through sixth aspects, the determining comprises: determining the first subband size when only one CSI-RS resource with only one port group is selected; and determining the second subband size when more than one CSI-RS resource or a CSI-RS resource with more than one port group is selected.

In an eighth aspect, alone or in combination with one or more of the first through seventh aspects, the determining comprises: determining to send PMI using the first subband size when the CSI report has only a single PMI; and determining to send all PMIs using the second subband size, or to send the PMI associated with a weaker CQI using the second subband size while sending other PMIs using the first subband size, when the CSI report has multiple PMI.

In a ninth aspect, alone or in combination with one or more of the first through eighth aspects, the determining comprises: determining to send all PMI using the first subband size when the UE has sufficient resources for the CSI report; and determining to send all PMI or PMI associated with a weaker CQI using the second subband size when the UE has insufficient resources for the CSI report.

In a tenth aspect, a method for wireless communications by a user equipment (UE), comprises receiving a channel state information (CSI) report configuration, the CSI report configuration associated with one or more CSI reference signal (RS) resources, each CSI-RS resource comprising a set of ports or port groups; selecting at least two CSI-RS resources or at least one CSI-RS resource with at least two port groups, of the configured CSI-RS resources, for which to report CSI; and sending a CSI report for the selected CSI-RS resource or resources, wherein sending the CSI report comprises: determining the UE has insufficient resources for the CSI report; and determining to omit at least a portion of the CSI associated with all, or only one, of the at least two CSI-RS resources or port groups.

In an eleventh aspect, alone or in combination with the tenth aspect, the CSI report configuration configures the UE to report at least a CSI resource indicator (CRI) indicating the selected CSI-RS resource or resources and, for each selected CSI-RS resource or port group in the selected CSI-RS resources, a rank indicator (RI), a precoding matrix indicator (PMI), and a channel quality indicator (CQI).

In a twelfth aspect, alone or in combination with one or more of the tenth aspect and eleventh aspects, the method further comprises receiving one or more CSI-RS; measuring the channel associated with the ports associated with triggered CSI-RS resources, wherein the selection is based on the measurements; and sending the CSI report based on the measurements.

In a thirteenth aspect, alone or in combination with one or more of the tenth through twelfth aspects, the portion of the CSI comprises the subband PMIs of all of the at least two CSI-RS resources or port groups or only the subband PMI of the CSI-RS resource or port group associated with the weaker CQI.

In a fourteenth aspect, alone or in combination with one or more of the tenth through thirteenth aspects, the portion of the CSI comprises the CSI for either even resource blocks (RBs) or odd RBs.

In a fifteenth aspect, a method for wireless communications by a base station (BS) comprises providing a user equipment (UE) with a channel state information (CSI) report configuration, the CSI report configuration associated with one or more CSI reference signal (RS) resources, each CSI-RS resource comprising a set of ports or port groups; receiving a CSI-RS resource indicator (CRI) from the UE indicating one or more CSI-RS resources for which the UE reports CSI; and determining a first subband size, a second subband size, or both for receiving a CSI report from the UE, wherein the determination is based on at least one of: the CRI or sufficiency of available resources at the UE for sending the CSI report.

In a sixteenth aspect, alone or in combination with the fifteenth aspect, the CSI report configuration configures the UE to report the CRI and, for each selected CSI-RS resource or each port group in the selected CSI-RS resources, a rank indicator (RI), a precoding matrix indicator (PMI), and a channel quality indicator (CQI).

In a seventeenth aspect, alone or in combination with the fifteenth or sixteenth aspects, the method further comprises sending one or more CSI-RS to the UE; and receiving a CSI report using the determined first subband size, second subband size, or both.

In an eighteenth aspect, alone or in combination with one or more of the fifteenth through seventeenth aspects, the CSI report configuration explicitly configures the first subband size; and the CSI report configuration explicitly configures the second subband size or the second subband size is derivable from the first subband size.

In an nineteenth aspect, alone or in combination with one or more of the fifteenth through eighteenth aspects, the second subband size is wideband.

In a twentieth aspect, alone or in combination with one or more of the fifteenth through nineteenth aspects, the determining comprises: determining the first subband size is used when the CRI indicates only one CSI-RS resource with only one port group; and determining the second subband size is used when the CRI indicates multiple CSI-RS resource or a CSI-RS resource with multiple port groups.

In a twenty-first aspect, alone or in combination with one or more of the fifteenth through twentieth aspects, the determining comprises: determining the first subband size is used for all PMI when the CRI indicates only a single CSI-RS resource with only one port group; and determining the second subband size is used for all PMIs or the second subband size for PMI associated with a weaker CQI while the first subband size is used for the other PMIs when the CRI indicates multiple CSI-RS resources or a CSI-RS resource with multiple port groups.

In a twenty-second aspect, alone or in combination with one or more of the fifteenth through twenty-first aspects, the determination comprises: determining the first subband size is used for all PMI when the UE has sufficient resources; and determining the second subband size is used for all PMI or the second subband size is used for PMI associated with a weaker CQI while the first subband size is used for the other PMIs when the UE has insufficient resources.

In a twenty-third aspect, a method for wireless communications by a base station (BS), comprises providing a user equipment (UE) with a channel state information (CSI) report configuration, the CSI report configuration associated with one or more CSI reference signal (RS) resources, each CSI-RS resource comprising a set of ports or port groups; receiving a CSI-RS resource indicator (CRI) from the UE indicating at least two CSI-RS resources or at least one CSI-RS resource with at least two port groups, of the configured CSI-RS resources, for which the UE reports CSI; and determining whether the UE omits at least a portion of the CSI based on the CRI and on whether the UE has sufficient available resources to report the CSI.

In a twenty-fourth aspect, alone or in combination with the twenty-third aspect, the CSI report configuration configures the UE to report the CRI and, for each CSI-RS resource or port group for which the UE report CSI, a rank indicator (RI), a precoding matrix indicator (PMI), and a channel quality indicator (CQI).

In a twenty-fifth aspect, alone or in combination with the twenty-third or twenty-fourth aspects, the method further comprises sending one or more CSI-RS to the UE; and receiving a CSI report from the UE.

In a twenty-sixth aspect, alone or in combination with one or more of the twenty-third through twenty-seventh aspects, the determining comprises determining that the UE omits the least a portion of the CSI according to a priority rule based on a determination that the UE has insufficient resources.

In a twenty-seventh aspect, alone or in combination with one or more of the twenty-third through twenty-sixth aspects, the portion of the CSI comprises the subband PMIs of all the at least two CSI-RS resources or port groups or only the subband PMI of the CSI-RS resource or port group associated with the weaker CQI.

In a twenty-eighth aspect, alone or in combination with one or more of the twenty-third through twenty-seventh aspects, the portion of the CSI comprises omitting the CSI for either even resource blocks (RBs) or odd RBs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), the method comprising:
   receiving a channel state information (CSI) report configuration, the CSI report configuration associated with one or more CSI reference signal (RS) resources, each CSI-RS resource comprising a set of ports or port groups, wherein the CSI report configuration explicitly configures a first subband size, and wherein the CSI report configuration explicitly configures a second subband size or the second subband size is derivable from the first subband size;
   selecting one or more CSI-RS resources, of the configured CSI-RS resources, for which to report CSI; and
   determining whether to use the first subband size, the second subband size, or both for sending a CSI report, wherein the determination is based, at least in part, on a payload of the CSI report.

2. The method of claim 1, wherein determining is based on the number of the CSI-RS resources or port groups in the selected CSI-RS resources selected for the CSI report, the number of rank indicators (RIs) in the CSI report, the number of precoding matrix indicators (PMI), or a sufficiency of resources available for the UE to transmit the content of the CSI report.

3. The method of claim 1, wherein the CSI report configuration configures the UE to report at least a CSI resource indicator (CRI) indicating the one or more selected CSI-RS resources and, for each selected CSI-RS resource or port group in the selected CSI-RS resources, a rank indicator (RI), a precoding matrix indicator (PMI), and a channel quality indicator (CQI).

4. The method of claim 1, further comprising:
   receiving one or more CSI-RS;
   measuring a channel associated with the ports associated with triggered CSI-RS resources, wherein the one or more CSI-RS resources are selected based on the measurements; and
   sending a CSI report based on the measurements using the determined first subband size, second subband size, or both.

5. The method of claim 1, wherein the second subband size is wideband.

6. The method of claim 1, wherein the determining comprises:
   determining the first subband size in response to only one CSI-RS resource with only one port group being selected; and
   determining the second subband size in response to more than one CSI-RS resource or a CSI-RS resource with more than one port group being selected.

7. The method of claim 1, wherein the determining comprises:
   determining to send a precoding matrix indicator (PMI) using the first subband size in response to the CSI report having only a single PMI; and
   determining to send all PMIs using the second subband size, or to send the PMI associated with a weaker channel quality indicator (CQI) using the second subband size while sending other PMIs using the first subband size, in response to the CSI report having multiple PMI.

8. The method of claim 1, wherein the determining comprises:
determining to send all a precoding matrix indicators (PMIs) using the first subband size in response to the UE having sufficient resources for the CSI report; and
determining to send all PMIs or PMIs associated with a weaker CQI using the second subband size in response to the UE having insufficient resources for the CSI report.

9. A method for wireless communications by a user equipment (UE), the method comprising:
receiving a channel state information (CSI) report configuration, the CSI report configuration associated with one or more CSI reference signal (RS) resources, each CSI-RS resource comprising a set of ports or port groups, wherein the CSI report configuration explicitly configures a single subband size;
selecting at least two CSI-RS resources or at least one CSI-RS resource with at least two port groups, of the configured CSI-RS resources, for which to report CSI; and
sending a CSI report for the selected at least two CSI-RS resources or the at least one CSI-RS resource with at least two port groups, wherein sending the CSI report comprises:
determining the UE has insufficient resources for the CSI report with the configured subband size; and
determining to omit at least a portion of the CSI associated with all, or only one, of the at least two CSI-RS resources or the at least one CSI-RS resource with at least two port groups, wherein the portion of the CSI comprises only a subband precoding matrix indicator (PMI) of the CSI-RS resource or port group associated with a weaker channel quality indicator (CQI) or the CSI for either even resource blocks (RBs) or odd RBs.

10. The method of claim 9, wherein the CSI report configuration configures the UE to report at least a CSI resource indicator (CRI) indicating the selected CSI-RS resource or resources and, for each selected CSI-RS resource or port group in the selected CSI-RS resources, a rank indicator (RI), the PMI, and the CQI.

11. The method of claim 10, further comprising:
receiving one or more CSI-RS;
measuring a channel associated with the ports associated with triggered CSI-RS resources, wherein the selection is based on the measurements; and
sending the CSI report based on the measurements.

12. A method for wireless communications by a base station (BS), comprising:
providing a user equipment (UE) with a channel state information (CSI) report configuration, the CSI report configuration associated with one or more CSI reference signal (RS) resources, each CSI-RS resource comprising a set of ports or port groups, wherein the CSI report configuration explicitly configures a first subband size, and wherein the CSI report configuration explicitly configures a second subband size or the second subband size is derivable from the first subband size;
receiving a CSI-RS resource indicator (CRI) from the UE indicating at least one of the one or more CSI-RS resources for which the UE reports CSI; and
determining the first subband size, the second subband size, or both for receiving a CSI report from the UE, wherein the determination is based on at least one of: the CRI or sufficiency of available resources at the UE for sending the CSI report.

13. The method of claim 12, wherein the CSI report configuration configures the UE to report the CRI and, for each selected CSI-RS resource or each port group in the selected CSI-RS resources, a rank indicator (RI), a precoding matrix indicator (PMI), and a channel quality indicator (CQI).

14. The method of claim 13, further comprising sending one or more CSI-RS to the UE.

15. The method of claim 12, wherein the second subband size is wideband.

16. The method of claim 14, wherein the determining comprises:
determining the first subband size is used in response to the CRI indicating only one CSI-RS resource with only one port group; and
determining the second subband size is used in response to the CRI indicating multiple CSI-RS resource or a CSI-RS resource with multiple port groups.

17. The method of claim 14, wherein the determining comprises:
determining the first subband size is used for all PMI in response to the CRI indicating only a single CSI-RS resource with only one port group; and
determining the second subband size is used for all PMIs or the second subband size for PMI associated with a weaker CQI while the first subband size is used for the other PMIs in response to the CRI indicating multiple CSI-RS resources or a CSI-RS resource with multiple port groups.

18. The method of claim 12, wherein the determination comprises:
determining the first subband size is used for all PMI in response to the UE having sufficient resources; and
determining the second subband size is used for all PMI or the second subband size is used for PMI associated with a weaker CQI while the first subband size is used for the other PMIs in response to the UE having insufficient resources.

19. A method for wireless communications by a base station (BS), comprising:
providing a user equipment (UE) with a channel state information (CSI) report configuration, the CSI report configuration associated with one or more CSI reference signal (RS) resources, each CSI-RS resource comprising a set of ports or port groups, wherein the CSI report configuration explicitly configures a single subband size;
receiving a CSI-RS resource indicator (CRI) from the UE indicating at least two CSI-RS resources or at least one CSI-RS resource with at least two port groups, of the configured CSI-RS resources, for which the UE reports CSI; and
determining whether the UE omits at least a portion of the CSI based on the CRI and on whether the UE has sufficient available resources to report the CSI with the configured subband size, wherein the portion of the CSI comprises only a subband precoding matrix indicator (PMI) of the CSI-RS resource or port group associated with a weaker channel quality indicator (CQI) or the CSI for either even resource blocks (RBs) or odd RBs.

20. The method of claim 19, wherein the CSI report configuration configures the UE to report the CRI and, for each CSI-RS resource or port group for which the UE report CSI, a rank indicator (RI), the PMI, and the CQI.

21. The method of claim 20, further comprising:
sending one or more CSI-RS to the UE; and
receiving a CSI report from the UE.

22. The method of claim 19, wherein the determining comprises determining that the UE omits the least a portion of the CSI according to a priority rule in response to a determination that the UE has insufficient resources available resources to report the CSI with the configured subband size.

* * * * *